US012634253B2

(12) United States Patent
Coupe

(10) Patent No.: US 12,634,253 B2
(45) Date of Patent: May 19, 2026

(54) METHOD FOR MANAGING THE TRANSMISSION OF A MESSAGE FROM A FIRST DEVICE TO A SECOND DEVICE, AND METHOD FOR MANAGING THE RECEIPT OF SUCH A MESSAGE

(71) Applicant: Orange, Issy-les-Moulineaux (FR)

(72) Inventor: Patrice Coupe, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 17/999,685

(22) PCT Filed: May 19, 2021

(86) PCT No.: PCT/FR2021/050881
§ 371 (c)(1),
(2) Date: Nov. 22, 2022

(87) PCT Pub. No.: WO2021/240093
PCT Pub. Date: Dec. 2, 2021

(65) Prior Publication Data
US 2023/0291704 A1     Sep. 14, 2023

(30) Foreign Application Priority Data

May 25, 2020     (FR) ...................................... 2005485

(51) Int. Cl.
*H04M 3/53*      (2006.01)
*H04L 51/212*     (2022.01)
*H04L 51/42*      (2022.01)
*H04W 4/12*      (2009.01)

(52) U.S. Cl.
CPC ............ *H04L 51/42* (2022.05); *H04L 51/212* (2022.05)

(58) Field of Classification Search
CPC .............................. H04L 51/42; H04L 51/212
See application file for complete search history.

(56) References Cited

U.S. PATENT DOCUMENTS

| | | | |
|---|---|---|---|
| 2002/0120600 A1* | 8/2002 | Schiavone | ............. H04L 51/214 |
| 2005/0119019 A1* | 6/2005 | Jang | ........................ H04W 4/14 |
| | | | 455/414.1 |
| 2016/0241530 A1* | 8/2016 | Andreev | ............... H04L 63/083 |
| 2018/0006983 A1* | 1/2018 | Steplyk | .................... H04L 51/10 |
| 2018/0152471 A1* | 5/2018 | Jakobsson | ........... H04L 63/1425 |
| 2019/0334764 A1* | 10/2019 | Chor | .................. G06F 11/0793 |
| 2020/0053214 A1* | 2/2020 | Kats | ...................... H04M 1/576 |
| 2020/0104304 A1* | 4/2020 | Oliner | ................... G06F 16/248 |
| 2021/0258297 A1* | 8/2021 | Wyseur | ................. H04L 63/083 |

OTHER PUBLICATIONS

International Search Report and Written Opinion dated Sep. 7, 2021 for Application No. PCT/FR2021/050881.

* cited by examiner

*Primary Examiner* — Christopher B Robinson
(74) *Attorney, Agent, or Firm* — Knobbe, Martens, Olson & Bear, LLP

(57) ABSTRACT

A method is described for managing the receipt of a message sent by a transmitting device via a communication network, the message being intended to be reproduced and being capable of being searched for among a plurality of received messages. The method includes receiving a message comprising a datum representative of a message with conditional display, the message only being displayed if it is the result of a search.

13 Claims, 3 Drawing Sheets

SYS

METHOD FOR MANAGING THE TRANSMISSION OF A MESSAGE FROM A FIRST DEVICE TO A SECOND DEVICE, AND METHOD FOR MANAGING THE RECEIPT OF SUCH A MESSAGE

RELATED APPLICATIONS

This application is the U.S. National Phase of Application No. PCT/FR2021/050881 entitled "METHOD FOR MANAGING THE TRANSMISSION OF A MESSAGE FROM A FIRST DEVICE TO A SECOND DEVICE, AND METHOD FOR MANAGING THE RECEIPT OF SUCH A MESSAGE" and filed May 19, 2021, which claims the benefit of French Patent Application No. 2005485, filed May 25, 2020, each of which is incorporated by reference in its entirety.

TECHNICAL FIELD

The invention relates to the field of telecommunications.

The invention relates more particularly to a method for managing the transmission of a message from a first device to a second device, and to a method for managing the reception of such a message.

The devices are data processing devices such as a computer, smartphone, tablets, etc.

STATE OF THE ART

Messaging environments, applications and services (instantaneous messaging, email, SMS, social publication services, etc.), technologies and search services now form part of daily life. Because of their intensive use, the existing messaging systems provoke a message overload and therefore an overload of information to be read on a screen.

The invention improves the situation.

THE INVENTION

To this end, according to a functional aspect, the invention deals with a method for managing the reception of a message from a sending device through a communication network, said message being intended to be rendered and being able to be searched for from among a plurality of messages received, characterized in that it comprises a step of reception of a message comprising a datum representative of a conditional display message, the message being displayed only if it is the result of a search.

According to the invention, when the receiving device receives a message destined to be displayed, its display must meet certain criteria; if not, the message is not displayed. The invention makes it possible to limit the number of messages displayed in the messaging environment by not displaying a message transmitted with an intention of not displaying it when it is received by the receiving device. According to the invention, a display is preceded by a step of searching for such a message in memory; if the result of the search includes the message, the latter is transmitted to the module responsible for displaying the messages. As long as the conditional access message is not the result of a message search, the conditional message is not transmitted to the module responsible for the display. The instant of display of the message is therefore very relevant because it corresponds to an instant when the information conveyed by this message is sought.

In other words, a step of searching in message memory through a set of messages is followed by a step of displaying the conditional display message received if the result of the search includes this message.

It is specified here that the display of a message targets the display of the message or of a part of the message including, for example, the sender of the message, the date and the subject of the message.

It is specified also that the module responsible for the display is a module whose function is to display a message chosen from a list of messages authorized to be displayed.

According to a first particular mode of implementation of the invention, a message has associated with it at least one keyword. In this configuration, the search step is based on said at least one keyword. Indeed, when the search is based on the datum representative of a conditional display message, the number of results can be significant. This feature makes it possible to reduce the number of results by using keywords such as "vacations", "work", etc.

According to another, second particular mode of implementation of the invention, which will be able to be implemented as an alternative to or together with the preceding ones, a message search is activated following the obtaining of an external datum. This way, the display is automated. An external datum drives a search and a display if the result of the search is fruitful.

According to another, third particular mode of implementation of the invention, which will be able to be implemented as an alternative to or together with the preceding modes, the external datum is a location of the receiving device. In this mode, the location for example makes it possible to display messages comprising information on a given place.

According to another, fourth particular mode of implementation of the invention, which will be able to be implemented as an alternative to or together with the preceding modes, a conditional display message is stored in memory only after a validation step. This feature allows the user receiving the message to automatically refuse conditional display messages do not occupy too much memory.

According to another, fifth particular mode of implementation of the invention, which will be able to be implemented as an alternative to or together with the preceding modes, following the storage step, a keyword can be modified. That allows the user receiving the message to associate with the message keywords that are more relevant so as to retrieve this message in a subsequent search.

Note that a keyword can be modified by using logic operators (and/or/etc.) according to the precision desired for the result of the search.

According to a hardware aspect, the invention relates to an entity for managing the reception of a message intended to be rendered from a sending device through a communication network, said message being intended to be rendered and being able to be searched for from among a plurality of messages received, characterized in that it comprises:

a module for receiving a message comprising a datum representative of a conditional display message;

a display module capable of displaying a message only if this message is the result of a search.

According to another hardware aspect, the invention relates to a data processing device comprising an entity as defined above.

According to another hardware aspect, the invention relates to a computer program that can be implemented on a mobile terminal, the program comprising code instructions which, when it is run by a processor, performs the steps of the method defined in the method defined above.

According to another hardware aspect, the invention relates to a data medium on which is stored at least one series of program code instructions for the execution of a method as defined above.

According to another functional aspect, the invention relates to a method for managing the sending of a message from a sending device to a receiving device through a communication network, said message being intended to be rendered, characterized in that it comprises the following steps:

a step of composition of a message including a datum, called first datum, representative of a conditional display message, a step of transmission of the message to a receiving device.

According to a particular mode of implementation of the invention, the message has associated with it at least one keyword.

According to a hardware aspect, the invention relates to an entity for managing the sending of a message from a sending device to a receiving device through a communication network, said message being intended to be rendered, characterized in that it comprises:

a module for composing a message, the message including a datum, called first datum, representative of a conditional display message, a module for transmitting the message to a receiving device.

According to another hardware aspect, the invention relates to a data processing device comprising an entity as defined above.

According to another hardware aspect, the invention deals with a computer program that can be implemented on a management entity as defined above, the program comprising code instructions which, when it is run by a processor, performs the steps of the method defined above.

Finally, the invention deals with a data medium on which is stored at least one series of program code instructions for the execution of the method defined above.

The data medium can be any entity or device capable of storing the program. For example, the medium can comprise a storage means, such as a RAM memory, a ROM memory, for example a CD ROM or a microelectronic circuit ROM, or even a magnetic storage means such as a hard disk. Also, the information medium can be a transmissible medium such as an electrical or optical signal, which can be routed via an electrical or optical cable, wireless or by other means. The program according to the invention can in particular be downloaded over an internet type network. Alternatively, the information medium can be an integrated circuit in which the program is incorporated, the circuit being adapted to execute or to be used in the execution of the method concerned.

Finally, it is indicated here that, in the present text, the term "module" or "entity" can equally correspond to a software component and to a hardware component or a set of hardware and software components, a software component itself corresponding to one or more computer programs or subprograms or, more generally, to any element of a program capable of implementing a function or a set of functions as described for the modules concerned. Likewise, a hardware component corresponds to any element of a hardware set capable of implementing a function or a set of functions for the module concerned (integrated circuit, chip card, memory card, etc.).

BRIEF DESCRIPTION OF THE DRAWINGS

The invention will be better understood on reading the following description, given as an example and with reference to the attached drawings in which.

DETAILED DESCRIPTION OF ONE OR MORE EXEMPLARY EMBODIMENTS ILLUSTRATING THE INVENTION

Figure 1:
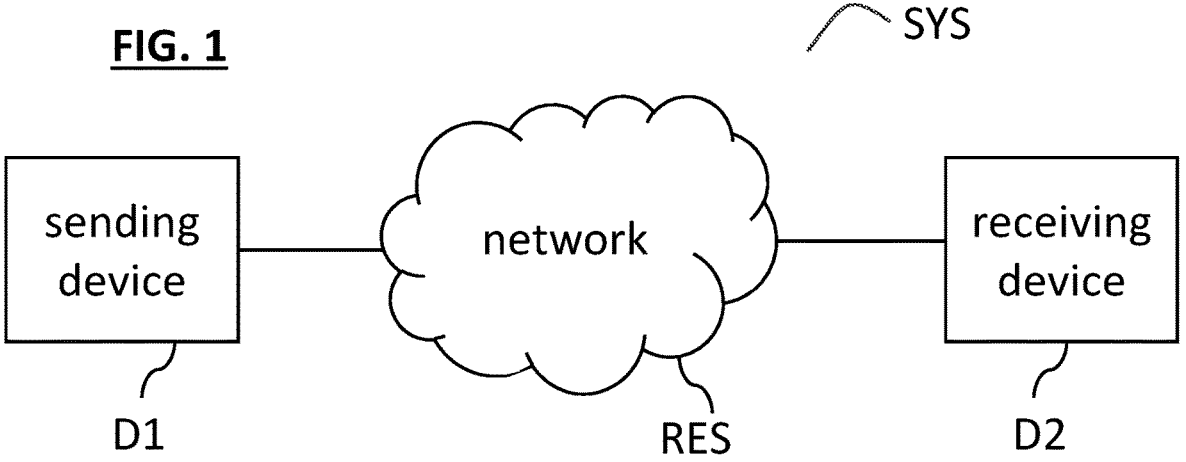
FIG. 1 represents a computing system illustrating an exemplary embodiment of the invention.

FIG. 1 is a schematic view of a computing system SYS in which the invention can be implemented.

The system SYS comprises a sending device D1 and a receiving device D2 communicating through a communication network RES.

The sending and receiving devices are devices capable of communicating via a network.

Figure 2:
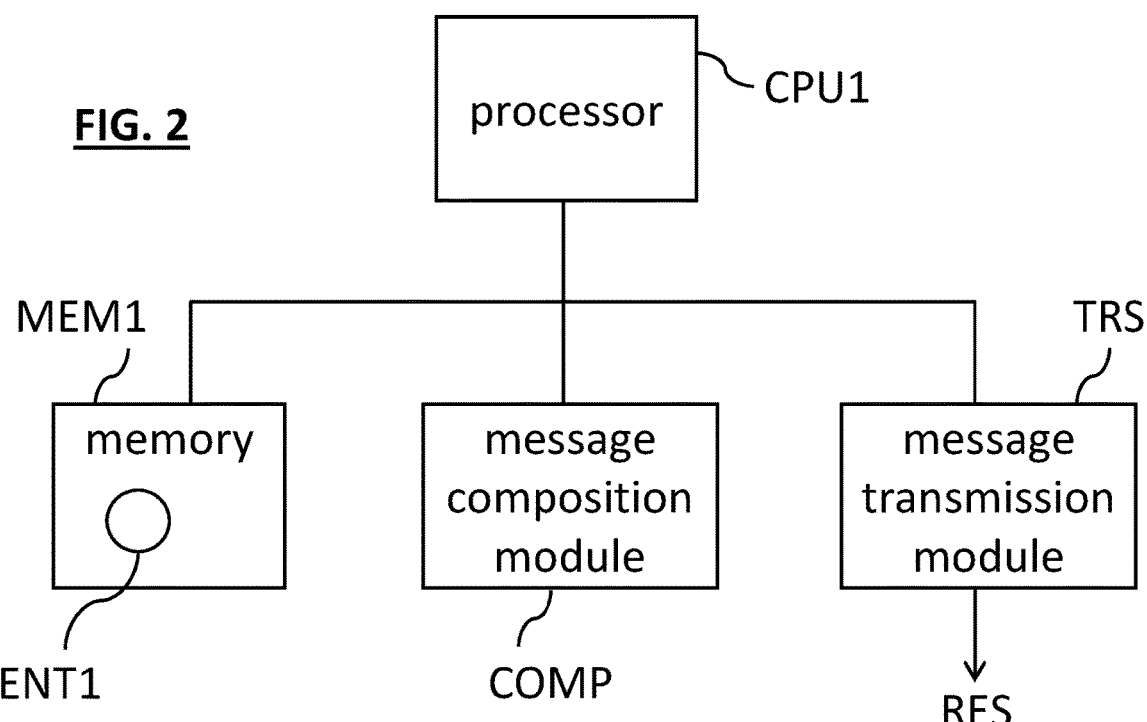
FIG. 2 is a schematic view of the architecture of a sending device according to an embodiment of the invention.
Figure 3:
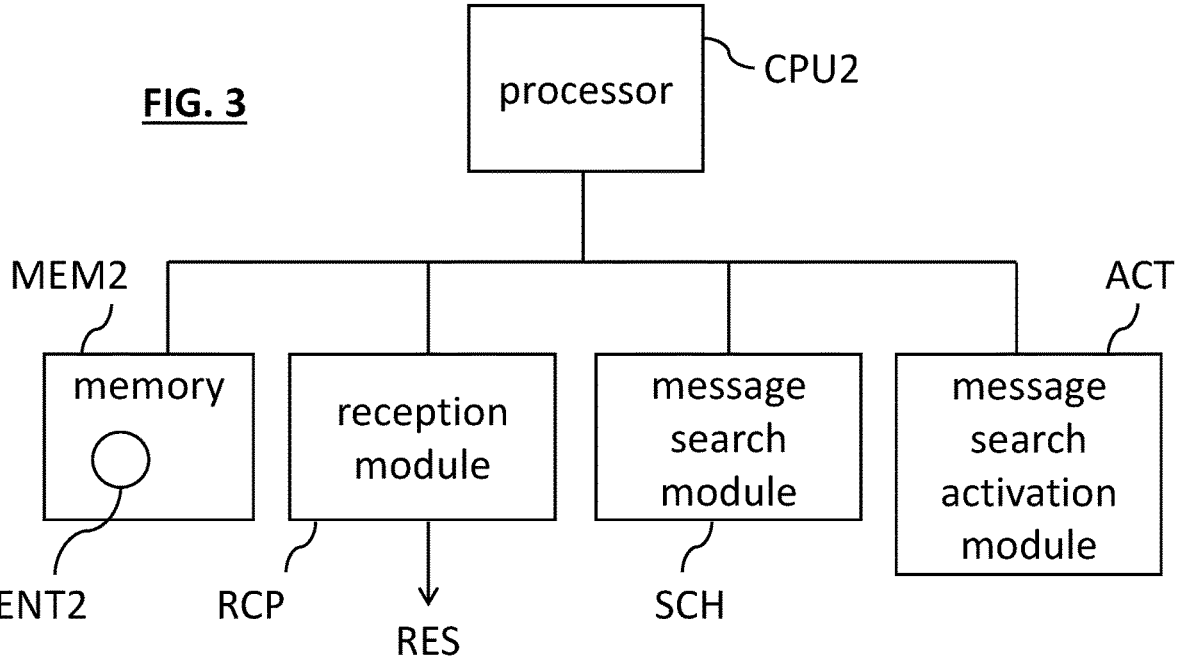
FIG. 3 is a schematic view of the architecture of a receiving device according to an embodiment of the invention.

Referring to FIGS. 2 and 3, the devices have the conventional architecture of a computer and notably respectively comprise processors (or microcontrollers) CPU1/CPU2, memories MEM1/MEM2 in which entities ENT1/ENT2 are stored. In our example, the entities ENT1/ENT2 are computer programs which comprise instructions for implementing the steps of the management method which will be described hereinbelow with reference to FIGS. 4 and 5, when the programs are run by the processors CPU1/CPU2.

Referring to FIG. 2, the device D1 further comprises a message composition module COMP and a message transmission module TRS.

The message composition module COMP includes a message composition interface allowing a user to input a message. It will also be seen that this interface makes it possible to specify a message type, called conditional display.

A conditional display message is understood to be a message which, when it is received by the receiving device, is displayed subject to certain criteria that must be met.

The function of the message transmission module TRS is to transmit a message over the network RES.

Referring to FIG. 3, the device D2 comprises, in addition to the processor CPU2 and the memory MEM2, a reception module RCP, a message search module SCH, a storage module MEM2, a message search activation module ACT.

Figure 4:
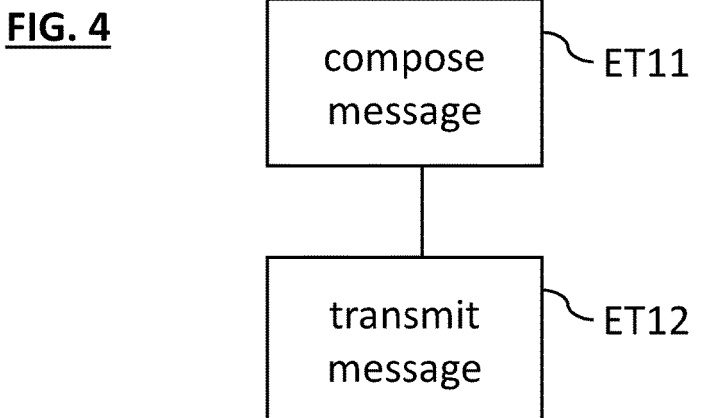
FIG. 4 illustrates an example of steps implemented by the sending device in the context of a method according to an embodiment.

FIG. 4 illustrates the steps of the processing method performed in the sending device D1 according to a first embodiment of the invention. The steps relating to a first phase are referenced ET1n ("1" designating the first phase and "n" the targeted step, "n" is an integer).

In a first phase, a message is composed and transmitted from the device D1 to the device D2.

During a first step ET1, the user A composes a message M by means of the user interface (not represented) of the message composition module COMP.

As explained above, the user interface allows the user to indicate that this message is a conditional display message. The indication can be produced in several ways.

The indication can be information (binary code, etc.) that can be interpreted by the receiving device; the latter is capable on reception of the code COD1 of detecting that the message received is a conditional display message and of storing the message concerned in memory and of deferring the conditional display of this message.

In addition, the user can also define a list of keywords that will be associated with the message M. In our example, the keywords associated with the message M are KA1(M) . . . KA*n*(M). In our example, the keywords are included in the message M but can also, as a variant, be attached to the message. Furthermore, the message M and the associated keywords can be transmitted at the same instant or at different instants.

Instead of being chosen by the user, the keywords can also be suggested and/or chosen from a list offered for selection.

Figure 6:
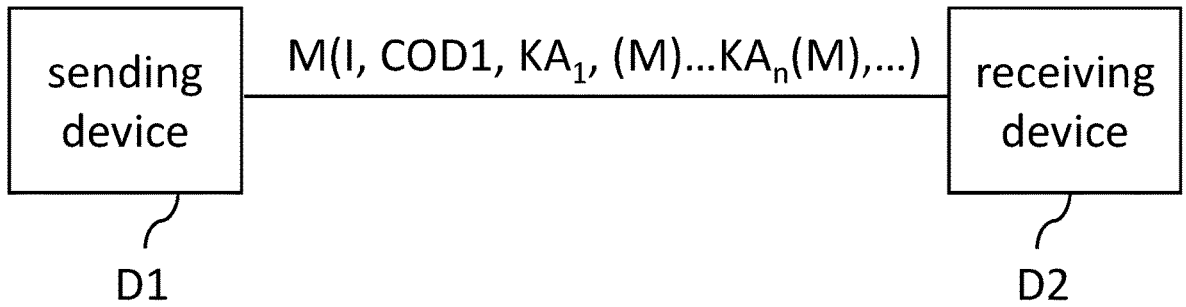
FIG. 6 schematically illustrates a method transmitted from a sending device to a receiving device.

Ultimately, referring to FIG. 6, in our example, at this stage, the message M comprises a code COD1, and keywords and information I such as a text.

Take the case where the two keywords KA1(M) and KA2(M) are, respectively, "vacation" and "Corsica".

The message can without preference be intended for a user or a list of recipients.

During a second step ET12, using the message transmission module TRS, once the message has been composed, the message M is transmitted to the receiving device D2.

Figure 5:
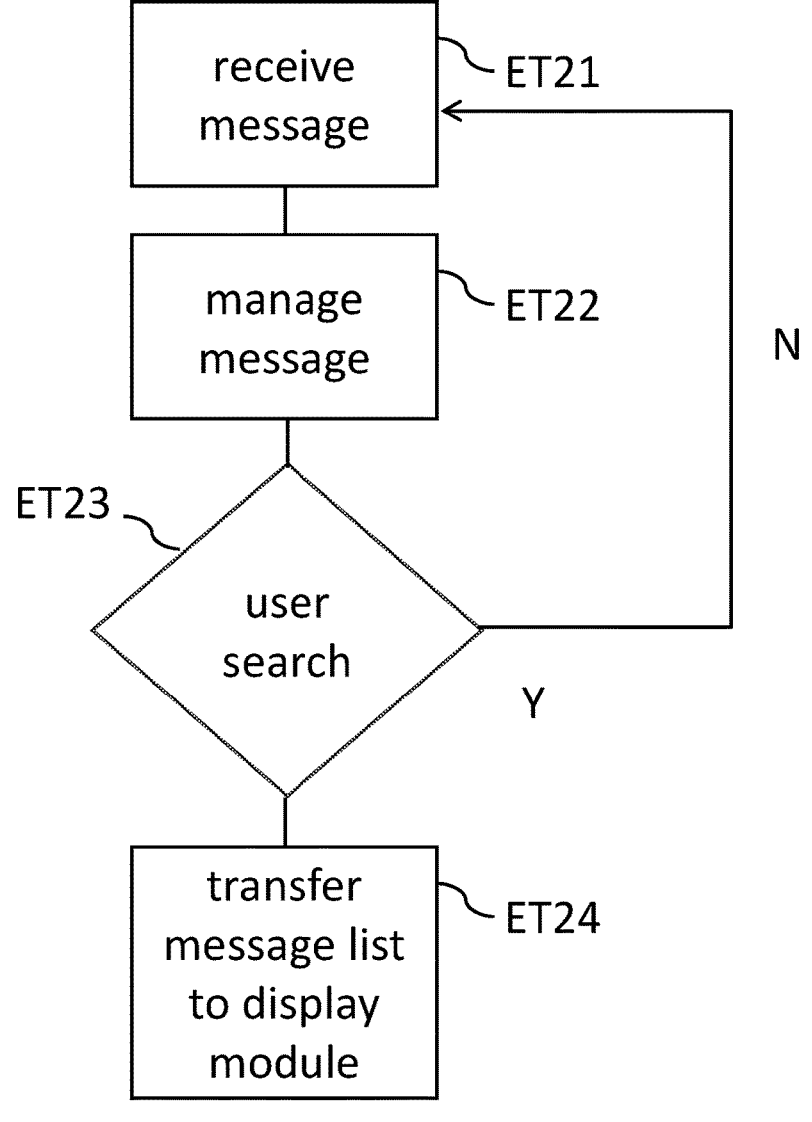
FIG. 5 illustrates an example of steps implemented by the receiving device in the context of a method according to an embodiment.

FIG. 5 illustrates the steps of the processing method performed in the receiving device D2 according to a first embodiment of the invention. The steps are referenced ET2*n* ("2" designating the first phase and "n" the targeted step, "n" is an integer).

In a first step ET21, the message is received by the message reception module RCP of the recipients selected by the user A.

It is assumed here that the message is transmitted to a single recipient B associated with the device D2.

According to one embodiment, the message reception component of the recipient device B can refuse the "conditional display" messages. In this case, the message is rejected by the recipient device. This systematic rejection allows the user to control his or her memory space in the memory MEM2 which could congest it with conditional display messages.

It is assumed here that the message reception component accepts the "conditional display" messages. A validation of the reception of such messages has for example been given previously.

During a second step ET22, the entity ENT2 manages the incoming messages of the user B according to two models.

If a message does not include code COD1, and it does not therefore relate to a conditional display message, the message concerned can be displayed. In our example, the message is therefore transmitted to the message display component AFF and displayed with no particular processing.

If a received message includes a code COD1 and it therefore has the properties of a message of the conditional display type, the message concerned is automatically stored in the message storage component without being displayed on the screen. Note that the storage component can be local and/or remote.

According to the invention, a display of a conditional display message takes place subject to the condition of knowing when the message concerned forms part of the result of a search for a message from among a set of messages received.

A search can take several forms.

According to a first form, a search can consist in searching for all the messages including a code COD1 and displaying them.

According to a second form, a message search can be performed in all the messages received by the device D2 or on a subset including the messages comprising the code COD1.

To reduce the number of messages to be displayed, a message search can further be based on the keywords associated with the message when it was composed.

For example, assume that the user B inputs keywords KB1 . . . KB*m* to search for a message (or several messages) comprising one of the keywords.

In our example, in a third step ET23, the user inputs the keywords KB1 and KB2, "vacation" and "Corsica", respectively in the search tool.

The search module SCH then retrieves the message or messages corresponding to the input keywords from among all the messages received contained in the memory MEM2, including, in our example, the flagged messages sent by users other than the user A.

If keywords correspond, in other words if one of the keywords KB1 . . . KB*m* corresponds to one of the keywords KA1 . . . KA*n*, according to the configurable search parameters and according to the algorithm selected to find the matches, the message M will be inserted into the result of the search made by the message search module.

In our example, the keywords "vacation" and "Corsica" match.

In our example, the search tool returns as response the message M.

In a fourth step ET24, once the result is obtained, the resulting list of the messages is transferred to the message display module which is responsible for displaying the messages.

In our example, the message M is transferred to the display module AFF to be displayed on the screen. The message M concerned which was probably of no interest upon its reception takes on importance at that instant. The display is therefore relevant.

In another embodiment, the conditional display messages have a limited lifetime so as to free up memory space in the second device D2. Indeed, in this mode, the starting principle is that a message not read during a given period will never be read.

The embodiments described above can be the subject of variants.

According to one variant, following the display of the message M following the message search, the user B can modify the code COD1 so that the message is no longer associated with a conditional display message but associated with another type of message, for example a conventional message. The resulting message is then displayed among the messages of the messaging tool used.

According to another variant, the recipient of the message B can modify the keywords defined in the message received.

According to another variant, a conventional message can be transformed into a conditional display message. A code COD1 is created for this purpose and associated with the message. The recipient can also associate with this message keywords as described previously. This way, the message received is no longer displayed and is stored in memory MEM2. This message is then accessed according to the method described above, namely following a message search.

A message can also have other properties. For example, a conditional display message can include a code COD2 meaning that the message must be deleted after it has been read on the device D2.

According to another variant, the sender of the message A also has the possibility of adding/deleting keywords to and from a message already transmitted and stored in the device D2. In this case, the modification can be transferred to the recipients that have received the message M.

According to another variant, the receiving device D2 comprises an activation module capable of activating the search module. The activation module is capable of activating the message search module based on an external input. The external input can take several forms described hereinbelow:

According to a first form, an external input can be analysis of a QR (or RFID tag), the QR code containing a list of keywords which will be communicated to the message search module by the search activation module.

According to a second form, the activation of the message search can be active and communicate with an external platform to convert an ID for example extracted from the QR code into a list of keywords to be supplied to the search module.

According to a third form, an ID/keywords list can be stored locally in the system SYS, for example in the sending device D1 and/or the receiving device D2.

Furthermore, according to a fourth form, the location of the receiving device D2 can also be an external datum. For example, if the recipient B is on vacation in Corsica, the activation module activates the search module SCRH with keywords linked with the location.

According to another variant, the user A can define a set of messages M1 . . . Mk with their associated keywords. When A adds a new contact C, A can choose to share with C the messages and their associated keywords. The message management system 9 will handle the sharing of the messages with the contact C using the method described below.

In this particular case, the user A of the system can retain in D1 all of the conditional display messages that he or she has sent in the past. When he or she creates a new contact C, the user A can choose to send to the user C the conditional display messages sent in the past. In one implementation, that can be done by setting an attribute on the contact C. In another application, that can be done by setting the contact C in a group of contacts of A who are recipients of the conditional display messages.

There are many use cases that implement the invention.

A first use case can concern a transmission of a recommendation message. In this example, the user A transmits a message recommending a restaurant in Paris with its address and a comment. The message could take the following form:

M. good #_restaurant in #_Paris brasserie Flottes brasserieflottes.fr, good steak tartare and professional service.

Later, when the user B searches for a restaurant in Paris, M is displayed.

Another use case can be the transmission of an enhanced secret message. The user A transmits a message M and, for additional security, wants this message not to be accessible unless a keyword is searched. In this use case, the user A separately communicates the keyword concerned to the user B, for example via a communication channel other than the network RES.

The message M concerned is for example:
"I have confidential information #_J6514SQ7_GHQSF165$//COD1=(J6514SQ7)//COD2=(GHQSF165)".

B can display M if, and only if, B enters "J6514SQ7" in the search.

In case of emergency, A can remotely destroy the message M on the device B by sending a dedicated delete message.

Another use case can concern a meeting report. In this case, the message M transmitted can take the following form.

"I met #_enterprise MA, #_contact Mr John Doe, and we discussed the evolution of 5G". Later, the user B, for example a colleague of A, before meeting the enterprise AAA, can perform a message search with MA as keyword. The message is displayed and the user B can read it in order to be well prepared for a planned meeting with the enterprise MA.

Another use case can relate to the transmission of an access code to a building by the user A.

The message M can take the following form

M: "#_code 123456". Later, the user B can easily search, at the right moment, for the access code of the user A from among the messages identified COD1.

The invention claimed is:

1. A method for managing receipt of a message from a sending device through a communication network, said message being intended for a given recipient to be rendered by a module responsible for a display of a receiving device associated with said recipient and being able to be, on said receiving device, a result of a search from among a plurality of received messages on the basis of keywords, wherein said message may comprise a datum representative of a conditional display message, the method comprising, in response to detection of the datum in said message:

storing the message in a memory of the receiving device without being transmitted to the module responsible for the display; and conditionally displaying the stored message, the message being displayed only if the message is a result of a subsequent search.

2. The method of claim 1, wherein the message is associated with at least one keyword, the subsequent search being performed by a user of the receiving device based on said at least one keyword.

3. The method of claim 1, wherein a message search is activated following an obtaining of an external datum.

4. The method of claim 3, wherein the external datum is a location of the receiving device.

5. The method of claim 1, wherein the conditional display message is stored in memory only after validation.

6. An entity for managing reception of a message intended to be rendered from a sending device through a communication network, said message being intended for a given recipient in order to be rendered by a module responsible for a display of a receiving device associated with said recipient, said message being able to be searched for from among a plurality of messages received, the entity comprising a processor, the entity configured to:

receive a message and when said message comprises a datum representative of a conditional display message;

store the received message in a memory of the receiving device without being transmitted to the module responsible for the display; and conditionally display the stored message only if the message is the result of a subsequent search.

7. A data processing device comprising the entity of claim 6.

8. A non-transitory computer readable medium having stored thereon instructions which, when executed by a processor, causes the processor to perform the method of claim 1.

9. A method for managing the sending of a message from a sending device to a receiving device through a communication network, said message being intended to be rendered by a module responsible for a display of the receiving device, the method comprising:

composing a message including a first datum representative of a conditional display message; and transmitting the message to a receiving device in order to be stored in a memory of the receiving device without being transmitted to the module responsible for the display, and the message only being displayed upon a determination that the message is a result of a subsequent search.

10. The method of claim 9, wherein the message is associated with at least one keyword.

11. An entity for managing the sending of a message from a sending device to a receiving device through a communication network, said message being intended to be rendered by a module responsible for a display of the receiving device, the entity comprising a processor, the entity configured to:

compose a message, the message including a first datum representative of a conditional display message; and transmit the message to a receiving device in order to be stored in a memory of the receiving device without being transmitted to the module responsible for the display, and the message only being displayed upon a determination that the message is a result of a subsequent search.

12. A data processing device comprising the entity of claim 11.

13. A non-transitory computer readable medium having stored thereon instructions which, when executed by a processor, causes the processor to perform the method of claim 9.

* * * * *